US008214826B2

(12) United States Patent  
Larcombe (10) Patent No.: US 8,214,826 B2  
(45) Date of Patent: Jul. 3, 2012

(54) OPTIMIZED TARGETING IN A LARGE SCALE SYSTEM

(75) Inventor: Steven Larcombe, Victoria Park (AU)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 11/869,200

(22) Filed: Oct. 9, 2007

(65) Prior Publication Data

US 2009/0094599 A1  Apr. 9, 2009

(51) Int. Cl.
*G06F 9/445* (2006.01)

(52) U.S. Cl. ........................................................ 717/177

(58) Field of Classification Search .................... 717/177
See application file for complete search history.

(56) References Cited

U.S. PATENT DOCUMENTS

| | | | |
|---|---|---|---|
| 5,598,566 A * | 1/1997 | Pascucci et al. ............... 713/324 |
| 6,122,664 A * | 9/2000 | Boukobza et al. ............ 709/224 |
| 6,301,707 B1 | 10/2001 | Carroll et al. |
| 6,968,550 B2 * | 11/2005 | Branson et al. ............... 717/168 |
| 7,574,706 B2 * | 8/2009 | Meulemans et al. .......... 717/174 |
| 7,765,281 B1 * | 7/2010 | Crow et al. .................... 717/173 |
| 7,831,972 B2 * | 11/2010 | Moore et al. .................. 717/174 |
| 2003/0163807 A1 * | 8/2003 | Drake et al. ................... 717/174 |
| 2003/0196190 A1 * | 10/2003 | Ruffolo et al. ................ 717/124 |
| 2004/0015942 A1 * | 1/2004 | Branson et al. ............... 717/168 |
| 2004/0243995 A1 * | 12/2004 | Sheehy .......................... 717/174 |
| 2004/0243996 A1 * | 12/2004 | Sheehy et al. ................. 717/174 |
| 2005/0120106 A1 | 6/2005 | Albertao |
| 2005/0198629 A1 | 9/2005 | Vishwanath |
| 2006/0069744 A1 * | 3/2006 | Alberti et al. ................. 709/217 |

FOREIGN PATENT DOCUMENTS

WO    WO 00/36503    6/2000

* cited by examiner

*Primary Examiner* — Wei Zhen
*Assistant Examiner* — Junchun Wu
(74) *Attorney, Agent, or Firm* — Stephen R. Tkacs; Stephen J. Walder, Jr.; Jeffrey S. Labaw (57) ABSTRACT

A mechanism is provided that utilizes the attributes of the nodes to build a target list and creates filters based on the node attributes. The filters are installed on the mediators. Each mediator then applies that filter to its own local node list to create a local target list. This local target list will then contain the list of local nodes that need to have a targeted action applied, such as software installed, on them. The mediator then carries out the targeted action, such as software installation, on those nodes. By extending discovered node information with arbitrary attributes, the resolution of target lists defined by filters applied to the master node list is increased.

24 Claims, 8 Drawing Sheets

Mediator A – local node list 202

| Node ID | Managing Mediator | Operating System | Department Code | Location |
|---|---|---|---|---|
| Node_A | A | AIX | 01 | New York |
| Node_B | A | AIX | 02 | New York |
| Node_C | A | Linux | 01 | New York |
| Node_D | A | Linux | 01 | New York |

Mediator B – local node list 204

| Node ID | Managing Mediator | Operating System | Department Code | Location |
|---|---|---|---|---|
| Node_E | B | AIX | 01 | London |
| Node_F | B | AIX | 01 | London |
| Node_G | B | Linux | 02 | London |
| Node_H | B | Linux | 03 | London |

Console A – master node list 206:

| Node ID | Managing Mediator | Operating System | Department Code | Location |
|---|---|---|---|---|
| Node_A | A | AIX | 01 | New York |
| Node_B | A | AIX | 02 | New York |
| Node_C | A | Linux | 01 | New York |
| Node_D | A | Linux | 01 | New York |
| Node_E | B | AIX | 01 | London |
| Node_F | B | AIX | 01 | London |
| Node_G | B | Linux | 02 | London |
| Node_H | B | Linux | 03 | London |

Filter = "Operating System EQUALS AIX":

When applied to Console A, the target list 302 is:

| Node ID | Managing Mediator | Operating System | Department Code | Location |
|---|---|---|---|---|
| Node_A | A | AIX | 01 | New York |
| Node_B | A | AIX | 02 | New York |
| Node_E | B | AIX | 01 | London |
| Node_F | B | AIX | 01 | London |

When applied to Mediator A, the target list 304 is:

| Node ID | Managing Mediator | Operating System | Department Code | Location |
|---|---|---|---|---|
| Node_A | A | AIX | 01 | New York |
| Node_B | A | AIX | 02 | New York |

When applied to Mediator B, the target list 306 is:

| Node ID | Managing Mediator | Operating System | Department Code | Location |
|---|---|---|---|---|
| Node_E | B | AIX | 01 | London |
| Node_F | B | AIX | 01 | London |

Filter = "Department Code EQUALS 01":

When applied to Console A, the target list 402 is:

| Node ID | Managing Mediator | Operating System | Department Code | Location |
|---|---|---|---|---|
| Node_A | A | AIX | 01 | New York |
| Node_C | A | Linux | 01 | New York |
| Node_D | A | Linux | 01 | New York |
| Node_E | B | AIX | 01 | London |
| Node_F | B | AIX | 01 | London |

When applied to Mediator A, the target list 404 is:

| Node ID | Managing Mediator | Operating System | Department Code | Location |
|---|---|---|---|---|
| Node_A | A | AIX | 01 | New York |
| Node_C | A | Linux | 01 | New York |
| Node_D | A | Linux | 01 | New York |

When applied to Mediator B, the target list 406 is:

| Node ID | Managing Mediator | Operating System | Department Code | Location |
|---|---|---|---|---|
| Node_E | B | AIX | 01 | London |
| Node_F | B | AIX | 01 | London |

OPTIMIZED TARGETING IN A LARGE SCALE SYSTEM

FIELD OF THE INVENTION

The present invention relates generally to performing a targeted action, such as software installation, and, more specifically, to an optimized targeting system and method for performing a targeted action, such as large scale distributed automated software installation, on targeted nodes.

BACKGROUND OF THE INVENTION

One of the problems for automated software installation in a distributed networking environment spanning multiple networks and geographical locations is the selection of target computer systems for installation and the transmission of requests to those machines to perform the installations. When the number of potential targets for installation is large (hundreds of thousands), the number and complexity of messages required to facilitate the installation also increases. Traditional methods to reduce the overhead of this messaging involve proxying messages through computer systems that are logically (and/or physically) closer to the target systems. In computer networks, a proxy server is a server (a computer system or an application program) which services the requests of its clients by making requests to other servers. While this approach does reduce messaging overhead and increases throughput, physical limitations in network bandwidth and processing capabilities mean that an upper limit exists for the total number of installation messages that can be sent simultaneously. Existing technologies providing automated software installation can only support installations in the order of thousands of targets.

There is a need for a new system which provides communication between the centralized management interface and the proxy systems such that unique sets of target computer systems can be targeted without the need to list those individual systems in the installation messages.

BRIEF SUMMARY OF THE INVENTION

The present invention provides an optimized targeting system for large scale distributed automated software installation.

This system assumes that an existing infrastructure is in place, consisting of one or more management stations (Consoles) and one or more installation executors (Mediators). Consoles provide the interface by which users of the system can initiate, monitor and control installation tasks. Mediators proxy installation messages between a console and the potential target computers. Potential target computers (Nodes) are any computers accessible from a Mediator via that Mediator's local network. By using network discovery techniques, each Mediator builds a list of nodes accessible via the local network (the local node list). This list is synchronized with the Consoles in the infrastructure so that each Console has a single list of all of the nodes on all of the mediators (a master node list). The master node list contains the union of all of the local node lists on each mediator. For each node discovered in this way, a basic set of attributes is determined for that node. These attributes form the basis for the targeting system. Instead of building a target list based on unique node identifiers (i.e., Node A, Node B, Node D), filters are created based on the node attributes. Applying these filters to the master node list results in a target list containing those nodes that match the filter conditions. The console then determines from the master node list which mediators in the infrastructure service those nodes. An installation message is then sent to each of those mediators containing the filter definition, not the list of nodes that need to have software installed. Each mediator then applies that filter to its own local node list to create a local target list. This local target list will then contain the list of local nodes that need to have software installed on them. The mediator then carries out the software installation on those nodes. By extending discovered node information with arbitrary attributes, the resolution of target lists defined by filters applied to the master node list is increased.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represents like elements between the drawings.

DETAILED DESCRIPTION OF THE INVENTION

The present invention provides an optimized targeting system method for large scale distributed automated software installation.

Figure 1:
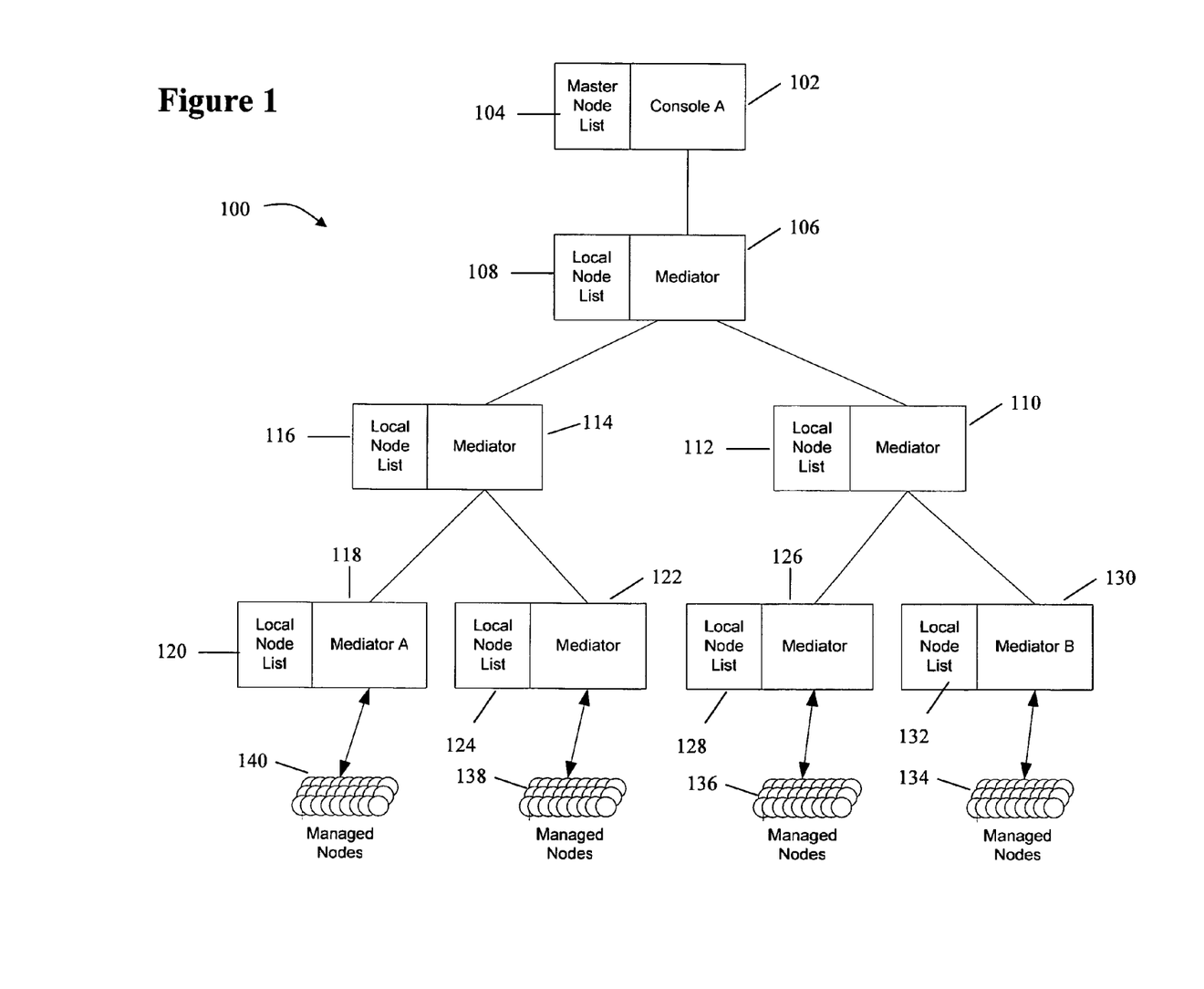
FIG. 1 illustrates the system of the present invention.

FIG. 1 illustrates a system 100 according to an aspect of the present invention. This system assumes that an existing infrastructure is in place, consisting of one or more management stations, or master nodes (Consoles 102) and one or more installation executors (Mediators 106, 110, 114, 118, 122, 126, 130). Consoles 102 provide the interface by which users of the system can initiate, monitor and control installation tasks. Mediators 106, 110, 114, 118, 122, 126, 130 proxy installation messages between a console 102 and potential target computers 134, 136, 138, 140. Potential target computers, or destination nodes, or target nodes (Managed Nodes 134, 136, 138, 140) are any computers accessible from a Mediator 106, 110, 114, 118, 122, 126, 130 via that Mediator's local network. Mediators 106, 110, 114, 118, 122, 126, 130 and Consoles 102 are connected together via existing networks (e.g., the Internet). Mediators are also called "Intermediate Nodes" as they are intermediate between Consoles and Managed Nodes. These terms will be user interchangeably within this document. It is not necessary for any given console or mediator to have direct network access to all other consoles or mediators. Messages can be routed via the Console/Mediator infrastructure to the final destination.

According to a system and method of an aspect of the present invention, each Mediator 106, 110, 114, 118, 122, 126, 130 in the system 100 stores information about the targets 134, 136, 138, 140 that it manages. For instance, in system 100, Mediator 118 manages Managed Nodes (target computers) 140 and stores information about Managed Nodes 140. This information can be discovered by the Mediator using network discovery techniques, input via a Console on the network, or a combination of both. This is known as the local node list. Each Mediator maintains a local node list 108, 112, 116, 120, 124, 128, 132.

Mediators synchronize their local target information with Consoles in the system so that Consoles have information about all targets across all of the Mediators in the system. This is known as a master node list. For instance, in system 100, Console 102 maintains master node list 104. Each Console has an identical copy of this list with each other Console in the system.

As shown in FIGS. 2, 3, 4 and 5, Users of the system have the ability to create groups of targets based on the node information in the master node list. A group is defined by a set of filtering rules that should be applied to the master node list. When a group filter is applied to the master node list, the resulting set of targets that match the filtering rules is known as a target list. Any given node may be a member of multiple groups as long as it satisfies the filtering rules for each group. This method of grouping allows for targets to be grouped by any of the available properties defined for the targets. By allowing the creation and assignment of arbitrary properties, groups can be defined for any logical situation. For example, node information may include abstract properties such as a department code, or a physical location. Groups could then be created for a particular department, or for a particular location.

Figure 2:
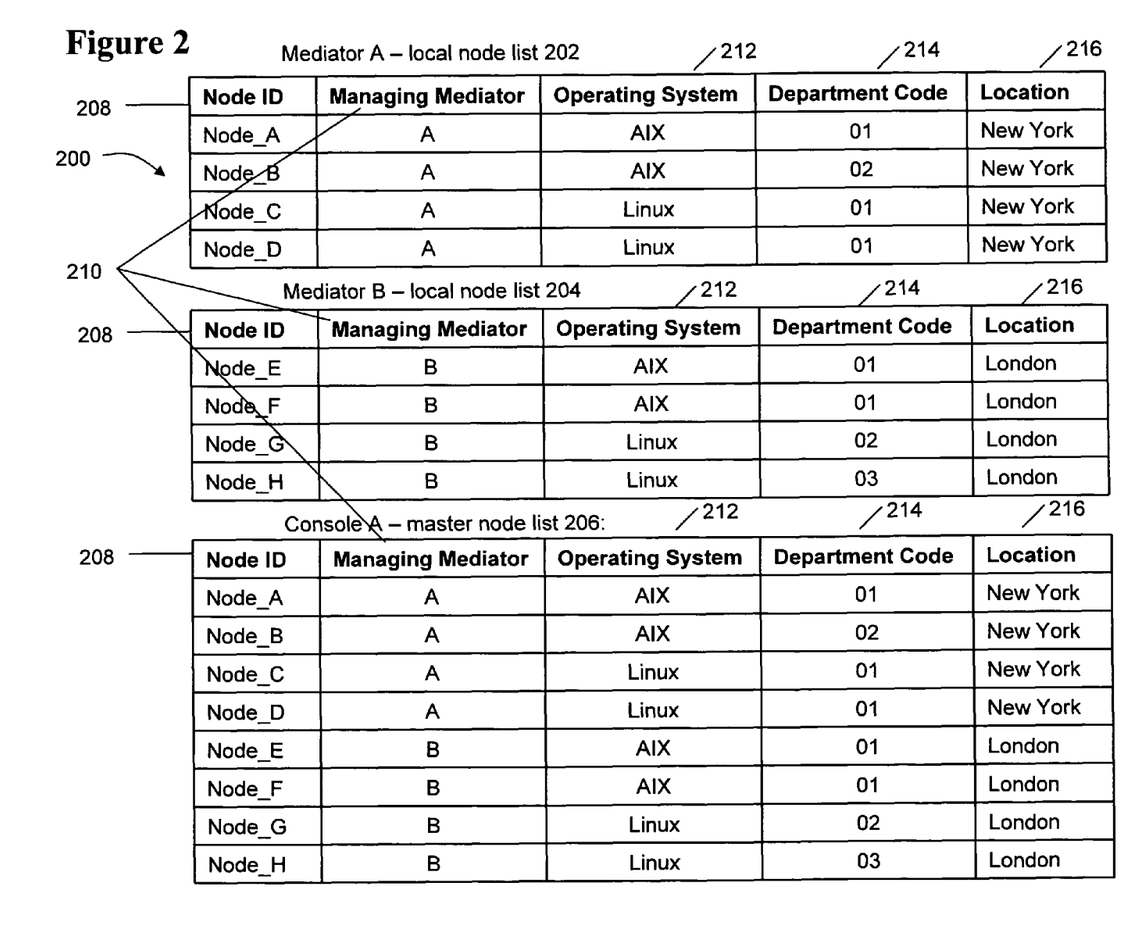
FIG. 2 illustrates local node lists for mediators and the master node list for Console A.

This is shown in FIG. 2 which illustrates local node lists 202, 204 for Mediator A, B (respectively) and master node list 206 for Console A. Each of local node lists 202, 204 and master node list 206 have a node ID list 208 which identifies the targets of the target group, a managing mediator list 210 which identifies the mediator which manages each particular target, an operating system list 212 which identifies the operating system being used by each particular target, a department code list 214 which identifies the department code for each particular target, and a location list 216 which identifies the physical location of each particular target. It can be seen that local node lists 202, 204 comprise local node information while master node list 206 comprises the data from both local node lists 202, 204. (It should be noted that these items are only marked in FIG. 2 and not in FIGS. 3 and 4.)

Figure 3:
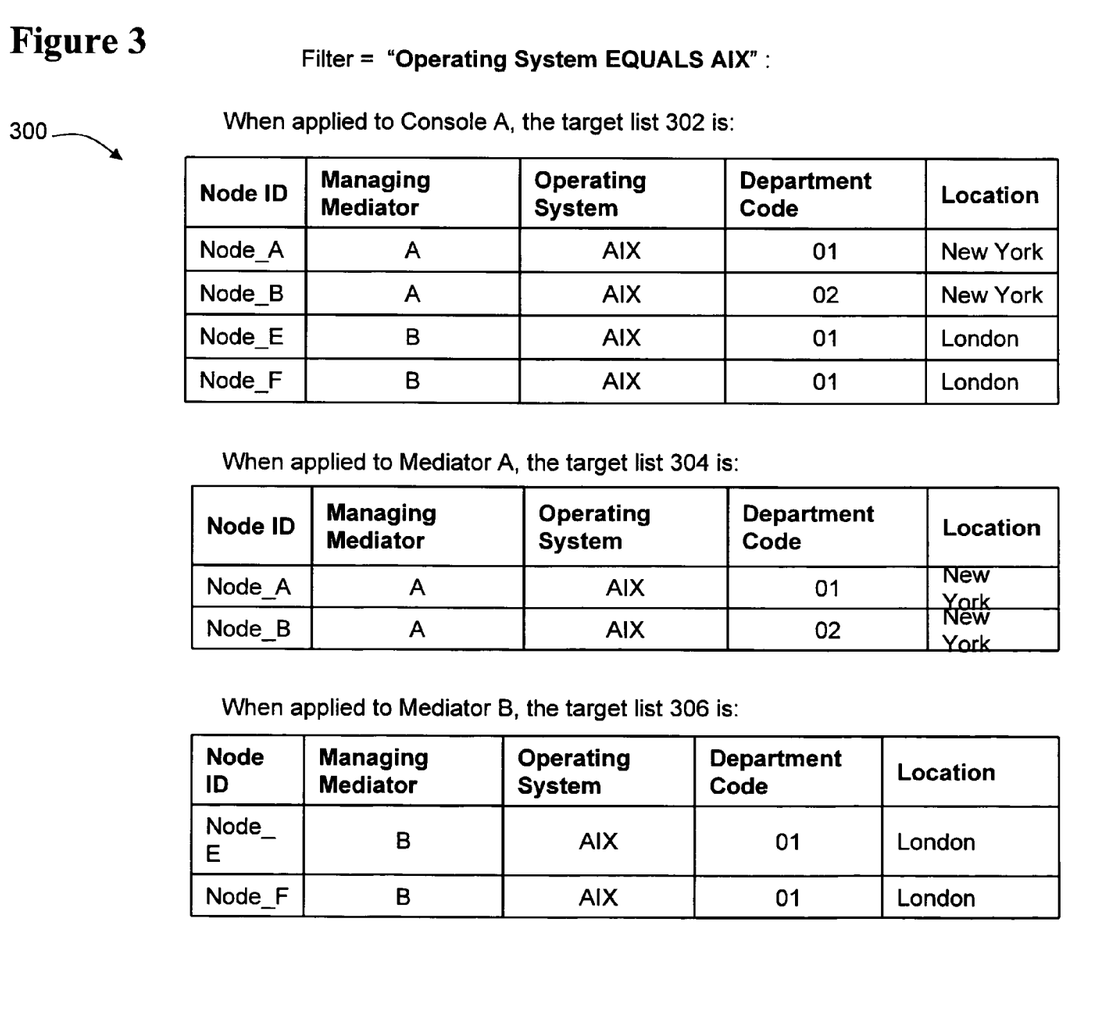
FIG. 3 illustrates the master node (target) list of Console A, and the local node (target) lists for Mediators of the present invention.

FIG. 3 similarly illustrates the master node (target) list 302 of Console A, the local node (target) lists 304, 306 for Mediator A, B (respectively) after the filter "Operating System EQUALS AIX" has been applied. The data shown in FIGS. 2, 3, 4 and 5 is shown for illustrative purposes as the target lists may comprise different data. The data of the master node list is first applied to Console A and then is applied to Mediator A's target list and Mediator B's target list.

Figure 4:
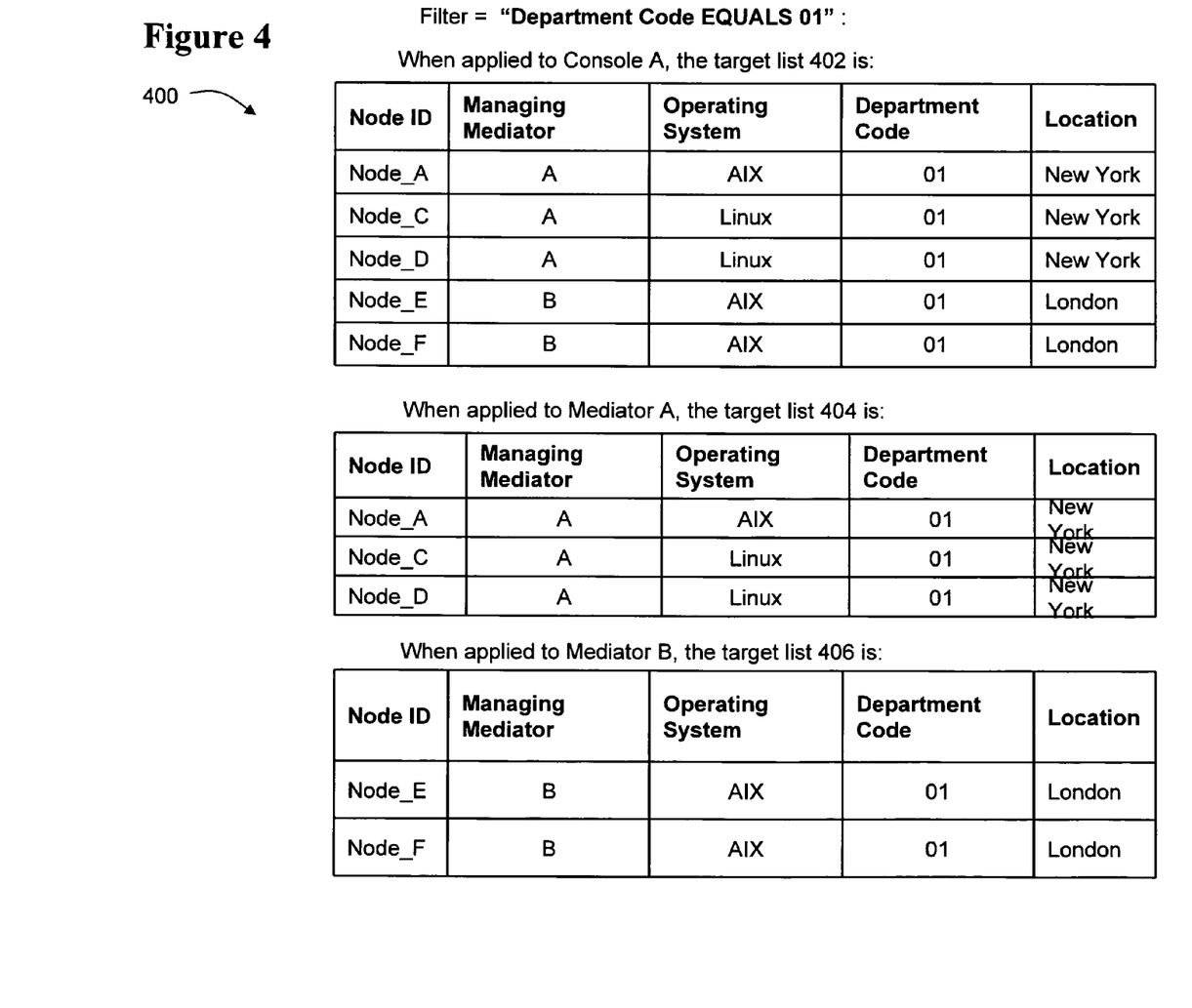
FIG. 4 likewise shows the master node (target) list of Console A, the local node (target) lists for Mediators of the present invention.

FIG. 4 likewise shows the master node (target) list 402 of Console A, the local node (target) lists 404, 406 for Mediator A, B (respectively) after the filter "Department Code EQUALS 01" has been applied.

As noted above, the method of grouping according to an aspect of the present invention allows for targets to be grouped by any of the available properties defined for the targets. By allowing the creation and assignment of arbitrary properties, groups can be defined for any logical situation. The groups can then be used to perform any targeted action, such as, but not limited to, software installation.

Figure 5:
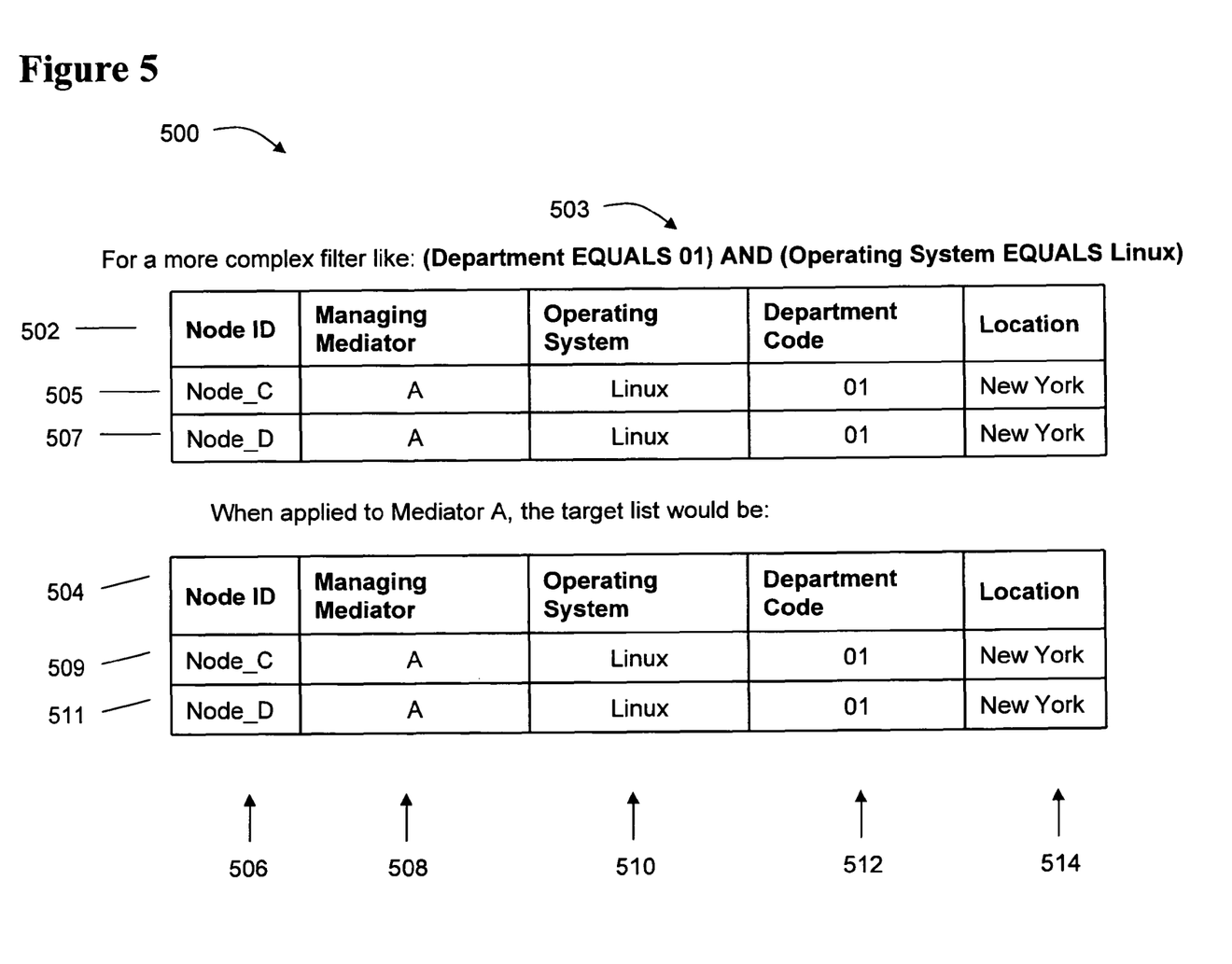
FIG. 5 illustrates a method according to an aspect of the present invention for creating a more complex filter.

FIG. 5 illustrates a method 500 according to an aspect of the present invention for creating a more complex filter than those shown in the previous figures. As can be seen, Master Node List 502 utilizes more complex filter 503 (Department EQUALS 01) AND (Operating System EQUALS Linux). For both Master Node List 502 and local node (target) list 504 for Mediator A, the node ID list is denoted by numeral 506, the managing mediator list is denoted by numeral 508, the operating system list is denoted by numeral 510, the department code list is denoted by numeral 512 and the location list is denoted by numeral 514. When the filter 503 is applied to Console A, the master node (target) list 502 includes Node C 505 and Node D 507. When the filter 503 is applied to Mediator A, the target list would show Node C 509 and Node D 511 as the Operating System 510 is Linux and the Department Code equals 01. The target list for Mediator B would be empty.

Figure 6:
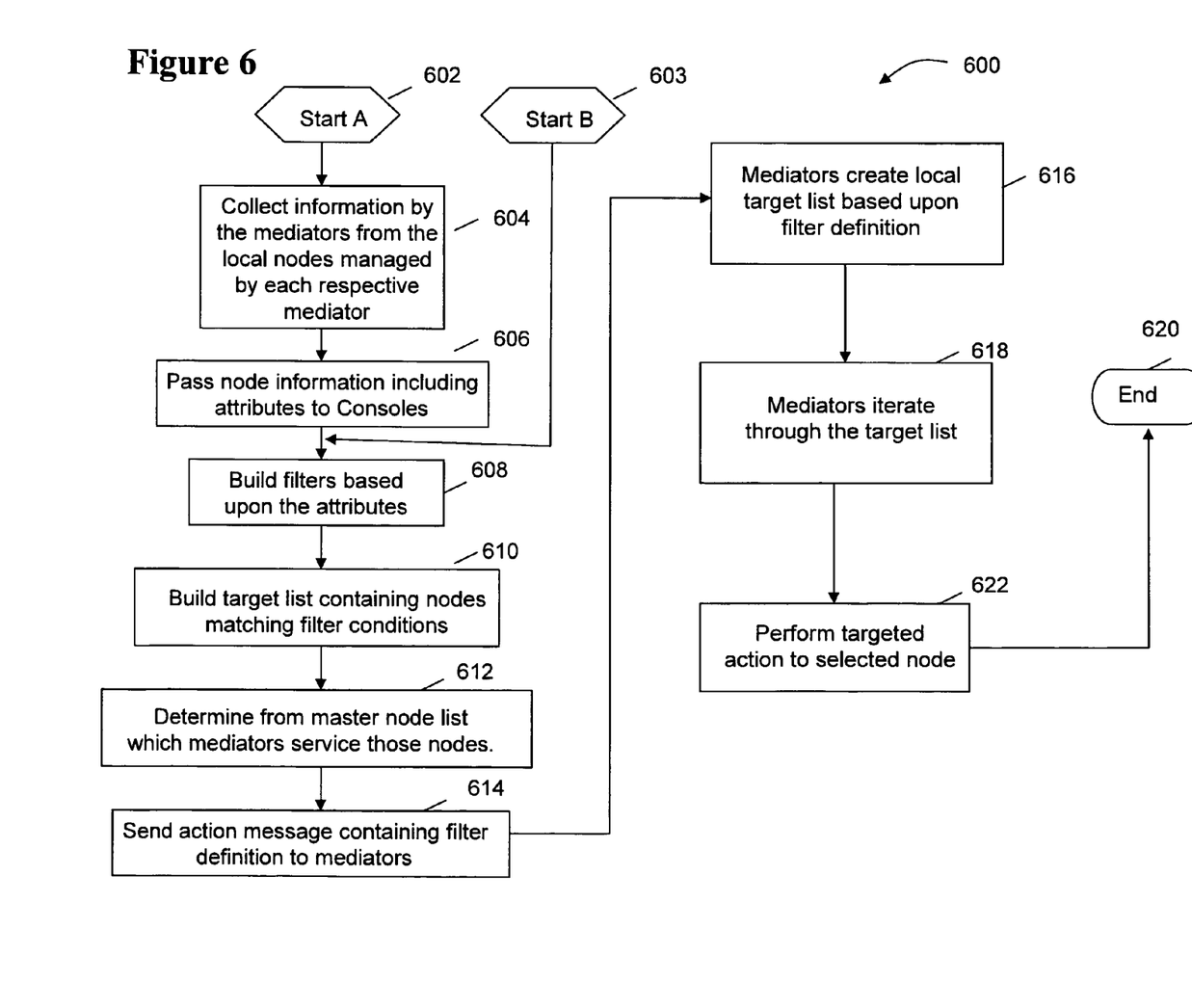
FIG. 6 illustrates a method according to an aspect of the present invention for optimized targeting for large scale distributed automated software installation.

FIG. 6 illustrates a method 600 according to an aspect of the present invention for targeting for large scale distributed automated software installation. If the master and local node lists have not yet been populated, method 600 starts at Start A 602 and moves to step 604 where the mediators collect information from the local nodes which each respective mediator manages, including the node attributes. According to an aspect of the present invention, instead of building a target list based on unique node identifiers (i.e., Node A, Node B, Node D), filters are created based on the node attributes. "Attributes set" and "criteria set" are terms which are used interchangeably in this document. At step 606, the node information, including the node attributes, is passed to the Consoles and proceeds to step 608. As noted above, discovery only occurs once to populate the master and local node lists. If the master and local node lists have been previously populated, method 600 begins at Start B 603 and proceeds to step 608. At step 608, filters are built at the Consoles based upon the received attributes. At step 610, at the Consoles, target lists are created containing nodes matching the filter conditions. At step 612, the master node list is examined to determine which mediators service the nodes in the target list. At step 614, an action message (e.g., an installation message) containing the filter definition is sent to the identified mediators. At step 616, the identified mediators create a local target list based upon the filter definition. At step 618, each mediator iterates through its local target list. At step 622, the mediator applies the targeted action, such as installing the software, to the selected node and the process ends at 620.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from one or more computer-usable or computer-readable media providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 7:
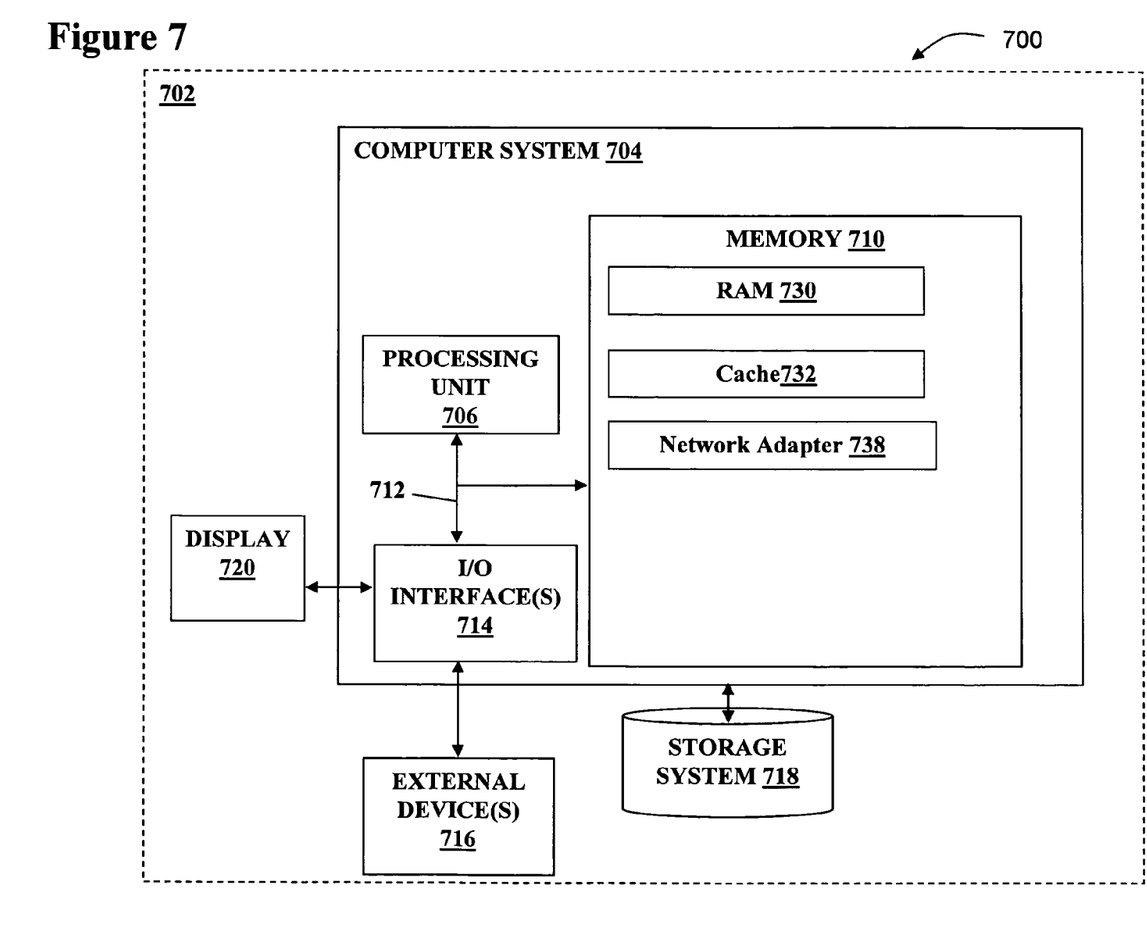
FIG. 7 illustrates a basic data processing system.

A data processing system, such as that system 700 shown in FIG. 7, suitable for storing and/or executing program code will include at least one processor (processing unit 706) coupled directly or indirectly to memory elements through a system bus. The memory elements can include local memory (RAM 730) employed during actual execution of the program code, bulk storage (storage 718), and cache memories (cache 732) which provide temporary storage of at least some program code in order to reduce the number of times code must be retrieved from bulk storage during execution. Input/output or I/O devices (external devices 716) (including but not limited to keyboards, displays, pointing devices, etc.) can be coupled to the system either directly or through intervening I/O controllers (I/O Interface 714).

Figure 8:
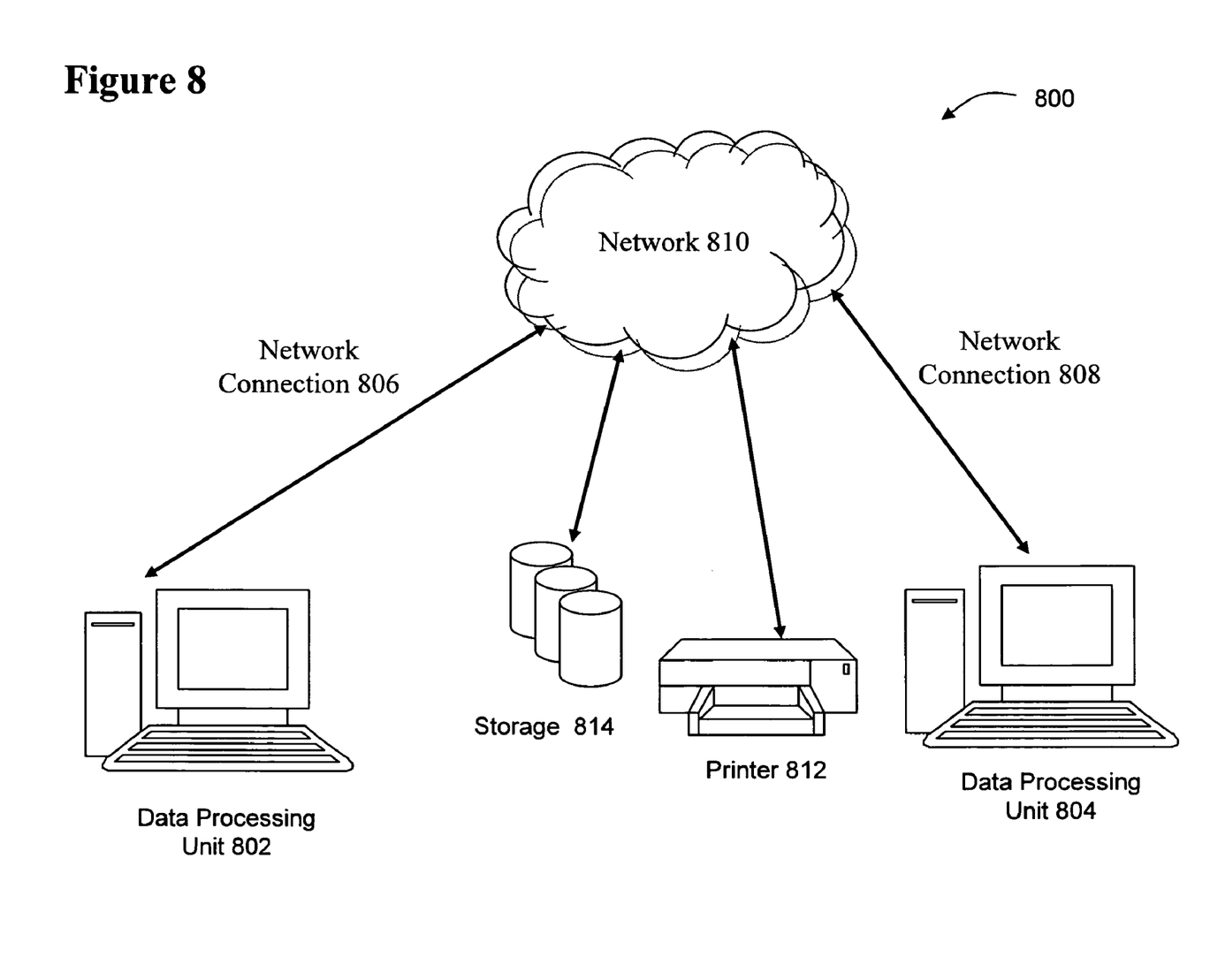
FIG. 8 illustrates the communication between two basic data processing systems over a network.

Network adapters (network adapter 738) may also be coupled to the system to enable the data processing system (as shown in FIG. 8, data processing unit 802) to become coupled to other data processing systems (data processing unit 804) or remote printers (printer 812) or storage devices (storage 814) through intervening private or public networks (network 810). (A computer network is composed of multiple computers connected together using a telecommunication system for the purpose of sharing data, resources and communication. For more information, see http://historyoftheinternet.org/) Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for targeting an action in a distributed system comprising a plurality of destination nodes, the method comprising:
   generating, by a console in the distributed system, a criteria set for a target action, wherein the target action is to be applied only to destination nodes satisfying the criteria set, wherein the criteria set omits explicit identification of any of the plurality of destination nodes;
   receiving local node lists from a plurality of intermediate nodes in the distributed system, wherein each of the plurality of intermediate nodes is coupled to at least one managed node within a plurality of managed nodes serviced by the plurality of intermediate nodes in the distributed system;
   generating a master node list from the local node lists, wherein the master node list comprises a list of the plurality of managed nodes serviced by the plurality of intermediate nodes and a set of attributes for each of the plurality of managed nodes;
   applying the criteria set to the master node list to identify a plurality of destination nodes within the plurality of managed nodes that satisfy the criteria set based on the set of attributes;
   identifying a subset of intermediate nodes within the plurality of intermediate nodes that service the plurality of destination nodes; and
   transmitting the criteria set from the console to the subset of intermediate nodes, wherein each of the subset of intermediate nodes is coupled to at least one of the plurality of destination nodes to be tested for satisfaction of the criteria set, wherein each intermediate node within the subset of intermediate nodes possesses information sufficient to determine whether each of the at least one of the plurality of destination nodes satisfies the criteria set.

2. The method of claim 1 further comprising determining whether each of the at least one of the plurality of destination nodes satisfies the criteria set.

3. The method of claim 2 further comprising performing targeted action on those destination nodes satisfying the criteria set.

4. The method of claim 2 further comprising building, by each of given intermediate node within the plurality of intermediate nodes, a list of destination nodes accessible to the given intermediate node.

5. The method of claim 4 wherein building the list of destination nodes accessible to the given intermediate node further comprises determining a set of attributes for each accessible destination node.

6. The method of claim 5 wherein the distributed system comprises a primary node coupled to the plurality of intermediate nodes, and wherein the method further comprises each of the plurality of intermediate nodes communicating its list of destination nodes to the primary node.

7. The method of claim 5 wherein generating the criteria set is based upon the set of attributes.

8. The method of claim 7 further comprising the primary node communicating the criteria set to the plurality of intermediate nodes.

9. A computer program product in a non-transitory computer readable medium for operating in a system comprising a network I/O, a CPU, and one or more databases, for implementing a method in a system for targeting an action in a distributed system comprising a plurality of destination nodes, the method comprising:
   generating, by a console in the distributed system, a criteria set for a target action, wherein the target action is to be applied only to destination nodes satisfying the criteria set, wherein the criteria set omits explicit identification of any of the plurality of destination nodes;
   receiving local node lists from a plurality of intermediate nodes in the distributed system, wherein each of the plurality of intermediate nodes is coupled to at least one managed node within a plurality of managed nodes serviced by the plurality of intermediate nodes in the distributed system;
   generating a master node list from the local node lists, wherein the master node list comprises a list of the plurality of managed nodes serviced by the plurality of intermediate nodes and a set of attributes for each of the plurality of managed nodes;

applying the criteria set to the master node list to identify a plurality of destination nodes within the plurality of managed nodes that satisfy the criteria set;

identifying a subset of intermediate nodes within the plurality of intermediate nodes that service the plurality of destination nodes; and transmitting from the console the criteria set from the console to the subset of intermediate nodes, wherein each of the subset of intermediate nodes is coupled to at least one of the plurality of destination nodes to be tested for satisfaction of the criteria set, wherein each intermediate node within the subset of intermediate nodes possesses information sufficient to determine whether each of the at least one of the plurality of destination nodes satisfies the criteria set.

10. The computer program product of claim 9 wherein the method further comprises determining whether each of the at least one of the plurality of destination nodes satisfies the criteria set.

11. The computer program product of claim 10 wherein the method further comprises performing targeted action on those destination nodes satisfying the criteria set.

12. The computer program product of claim 10 wherein the method further comprises building, by each given intermediate node within the plurality of intermediate nodes, a list of destination nodes accessible to the given intermediate node.

13. The computer program product of claim 12 wherein building the list of destination nodes accessible to the given intermediate node further comprises determining a set of attributes for each accessible destination node.

14. The computer program product of claim 13 wherein the distributed system comprises a primary node coupled to each of the plurality of intermediate nodes, and wherein the method further comprises each of the plurality of intermediate nodes communicating its list of destination nodes to the primary node.

15. The computer program product of claim 13 wherein generating the criteria set is based upon the set of attributes.

16. The computer program product of claim 15 wherein the method further comprises the primary node communicating the criteria set to the plurality of intermediate nodes.

17. A data processing system comprising:
a processor; and
a memory coupled to the processor, wherein the memory stores a computer readable program, which when executed by the processor implements a method for targeting an action in a distributed system comprising a plurality of destination nodes, the method comprising;
generating, by a console in the distributed system, a criteria set for a target action, wherein the target action is to be applied only to destination nodes satisfying the criteria set, wherein the criteria set omits explicit identification of any of the plurality of destination nodes;

receiving local node lists from a plurality of intermediate nodes in the distributed system, wherein each of the plurality of intermediate nodes is coupled to at least one managed node within a plurality of managed nodes serviced by the plurality of intermediate nodes in the distributed system;

generating a master node list from the local node lists, wherein the master node list comprises a list of the plurality of managed nodes serviced by the plurality of intermediate nodes and a set of attributes for each of the plurality of managed nodes;

applying the criteria set to the master node list to identify a plurality of destination nodes within the plurality of managed nodes that satisfy the criteria set;

identifying a subset of intermediate nodes within the plurality of intermediate nodes that service the plurality of destination nodes; and transmitting from the console the criteria set from the console to the subset of intermediate nodes, wherein each of the subset of intermediate nodes is coupled to at least one of the plurality of destination nodes to be tested for satisfaction of the criteria set, wherein each intermediate node within the subset of intermediate nodes possesses information sufficient to determine whether each of the at least one of the plurality of destination nodes satisfies the criteria set.

18. The data processing system of claim 17 wherein the method further comprises determining whether each of the at least one of the plurality of destination nodes satisfies the criteria set.

19. The data processing system of claim 18 wherein the method further comprises performing targeted action on those destination nodes satisfying the criteria set.

20. The data processing system of claim 18 wherein the method further comprises building, by each given intermediate node within the plurality of intermediate nodes, a list of destination nodes accessible to the given intermediate node.

21. The data processing system of claim 20 wherein building the list of destination nodes accessible to the given intermediate node further comprises determining a set of attributes for each accessible destination node.

22. The data processing system of claim 21 wherein the distributed system comprises a primary node coupled to each of the plurality of intermediate nodes, and wherein the method further comprises each of the plurality of intermediate nodes communicating its list of destination nodes to the primary node.

23. The data processing system of claim 21 wherein generating the criteria set is based upon the set of attributes.

24. The data processing system of claim 23 wherein the method further comprises the primary node communicating the criteria set to the plurality of intermediate nodes.

* * * * *